UNITED STATES PATENT OFFICE.

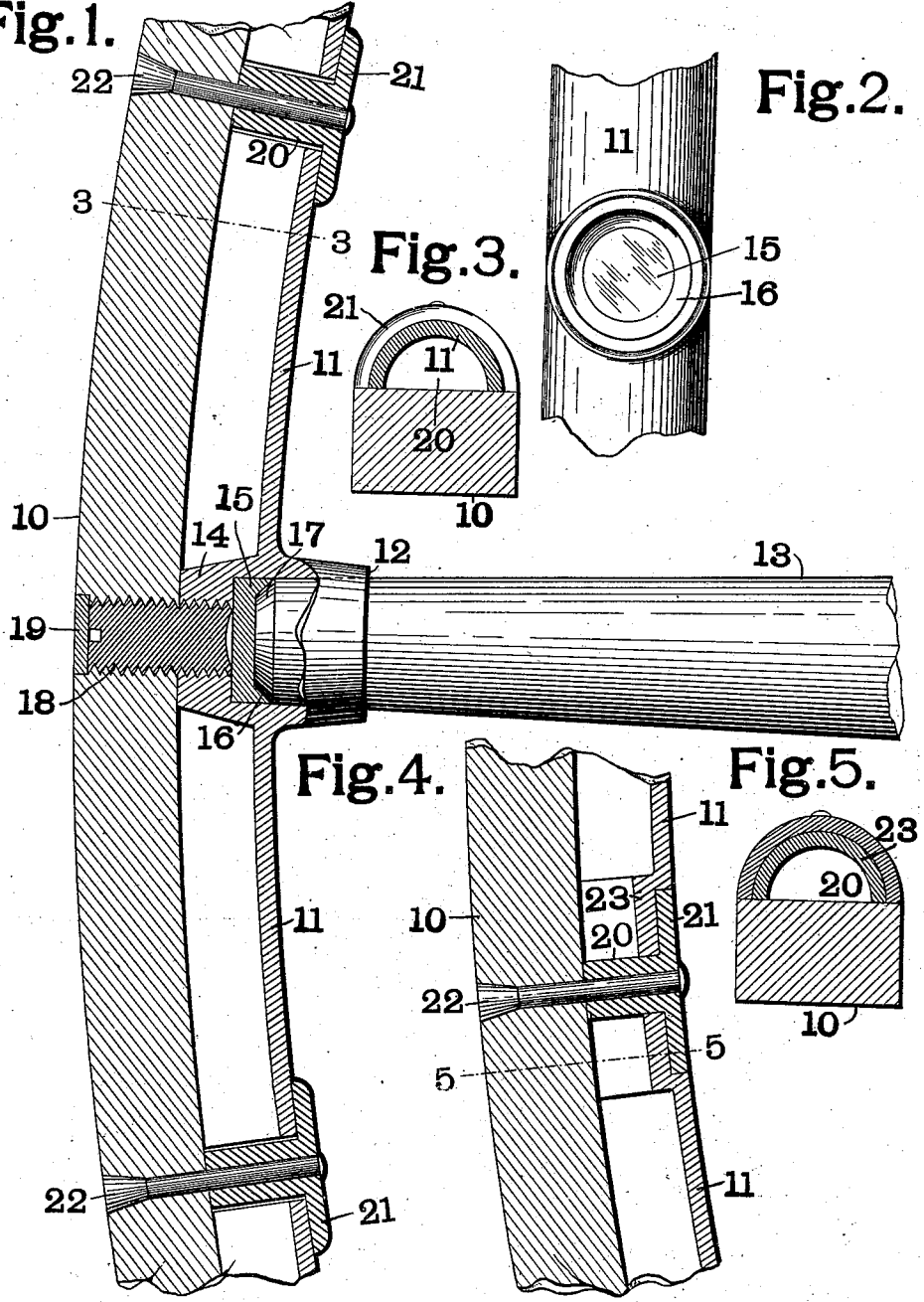

WILLIAM S. PLUMMER, OF ST. LOUIS, MISSOURI, ASSIGNOR TO AMERICAN WHEEL COMPANY, OF ST. LOUIS, MISSOURI, A CORPORATION OF MISSOURI.

FELLY FOR VEHICLE-WHEELS.

No. 857,200.  Specification of Letters Patent.  Patented June 18, 1907.

Application filed May 17, 1906. Serial No. 317,286.

*To all whom it may concern:*

Be it known that I, WILLIAM S. PLUMMER, a citizen of the United States, residing at the city of St. Louis, in the State of Missouri, have invented a certain new and useful Felly for Vehicle-Wheels, of which the following is such a full, clear, and exact description as will enable any one skilled in the art to which it appertains to make and use the same, reference being had to the accompanying drawings, forming part of this specification.

The object of my invention is to provide a hollow sectional metallic felly for vehicle wheels which will be light and durable and at the same time neat in appearance and the separate sections of which can be removed without disturbing the entire wheel.

In the accompanying drawings in which like marks of reference reffer to similar parts in the several views of the drawings, Figure 1 is a central vertical section through a portion of a wheel embodying my invention; Fig. 2 is a view of a portion of one of the sections showing a spoke socket; Fig. 3 is a section on the line 3—3 of Fig. 1; Fig. 4 is a view showing a slight modification of the retaining means for the sections, and Fig. 5 is a section on the line 5—5 of Fig. 4.

10 represents the rim of the wheel, which may also constitute the tire, as shown in the drawings. Inside of the rim 10 is the hollow metallic felly consisting of sections 11. Each section 11 is provided with one or more sockets 12 adapted to receive the end of a spoke 13. The portion of the section 11 below each of the sockets 12 is provided with a solid portion 14, and in each of the sockets 12 is a cup 15 provided with a bevel 16 and adapted to receive the beveled end 17 of the spoke 13. Passing through the rim or tire 10 and the solid portion 14 of the section 11, is a set screw 18, which bears upon the lower face of the cup 15. By means of this set screw 18 the cup 15 can be adjusted so as to give any strain or dish to the wheel desired, and at the same time the bevel 16 on the cup 15 in conjunction with the corresponding bevel 17 on the spoke prevents the spoke from becoming loose or rattling in the socket 12. When the rim 15 also constitutes the tire, I provide a disk or plug 19 for protecting the end of the screw 18, as shown in Fig. 1 of the drawings. In order to secure the sections 11 to the rim 10, I provide at the junction of each pair of sections a retaining member consisting of a body portion 20 and a pair of flanges 21. The body portion 20 is arranged between the adjacent ends of the two sections and the flanges 21 overlap or surround the said ends. The retaining member is held in place by means of a rivet 22. When the flanges 21 of the retaining member surround the full diameter of the sections 11, as shown in Figs. 1 and 3, the said retaining piece forms an offset or projection on the felly. In order to avoid this when desired I provide the ends of the sections with reduced portions 23, as shown in Figs. 4 and 5, so that the retaining member has its outer face flush with the outer face of the sections 11.

It will be evident that by removing the rivets 22 any one of the sections 11 can be removed from the wheel so that a new spoke or spokes 13 may be inserted, and that by removing the disk or plug 19 the set screws 18 can be adjusted so as to move the cups 15 in the sockets 12 and thus tighten the rim or tire 10 to give any desired dish to the wheel. At the same time my felly is light and strong and neat in appearance. When the form of retaining member shown in Figs. 4 and 5 is used, the joints between the various sections of the felly are perfectly smooth so as to present no offset or projection for the collection of dirt, or to prevent washing of the wheel.

Having fully described my invention, what I claim as new and desire to secure by Letters Patent of the United States, is—

1. In a vehicle wheel, the combination with a rim, of a sectional felly provided with sockets for the spokes, and means arranged between the adjacent ends of a pair of sections for holding said sections to said rim.

2. In a vehicle wheel, the combination with a rim, of a hollow sectional felly provided with sockets for the spokes, and means arranged between the adjacent ends of a pair of sections for holding said sections to said rim.

3. In a vehicle wheel, the combination with a rim, of a sectional felly provided with sockets for the spokes, and a retaining member arranged between and overlapping the adjacent ends of a pair of sections for holding said sections to said rim.

4. In a vehicle wheel, the combination with a rim, of a sectional felly provided with sockets for the spokes, a retaining member overlapping the adjacent ends of a pair of sections and provided with a projection extending between said ends, and a bolt or rivet extending through said rim and projection to hold said sections to said rim.

5. In a vehicle wheel, the combination with a rim, of a sectional felly provided with sockets for the spokes, and a retaining member arranged between but overlapping the adjacent edges of a pair of sections and flush with the outer surface of said sections.

6. In a vehicle wheel, the combination with a felly provided with a socket for a spoke, of a cup in said socket having a beveled seat for the end of a spoke, and means for adjusting said cup.

7. In a vehicle wheel, the combination with a rim, of a felly secured to said rim and provided with a socket for a spoke, a member in said socket and adapted to bear against the end of the spoke, a set screw passing through said rim and felly and bearing against said member, and means for protecting the head of said screw.

8. In a vehicle wheel, the combination with a rim, of a felly secured to said rim and provided with a socket for a spoke, a member in said socket and adapted to bear against the end of the spoke, and a set screw threaded into said rim and felly and bearing against said member.

9. In a vehicle wheel, the combination with a rim, of a hollow felly secured to said rim and provided with a socket for a spoke, said felly being provided with a solid portion adjacent to said socket, a member in said socket and adapted to bear against the end of the spoke, and a set screw threaded into said rim and the solid portion of the said felly and bearing against said member.

In testimony whereof, I have hereunto set my hand and affixed my seal in the presence of the two subscribing witnesses.

WM. S. PLUMMER. [L. S.]

Witnesses:
CHAS. E. COE,
BENJAMIN B. MOSS.